(No Model.) 2 Sheets—Sheet 1.
J. M. HUDSON.
PLOW AND ATTACHMENT.
No. 539,131. Patented May 14, 1895.
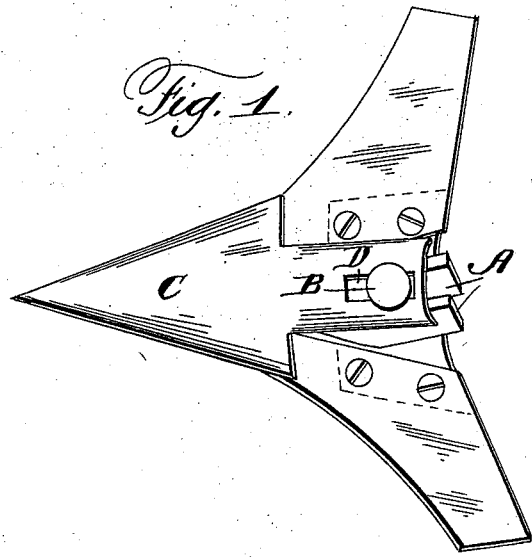
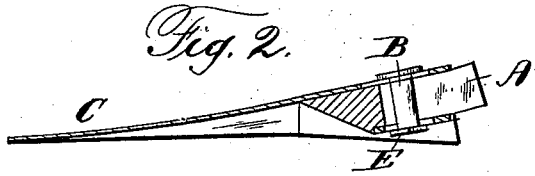
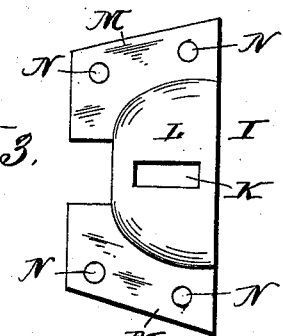
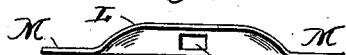
Witnesses:
Inventor:-
James M. Hudson
by H. B. Willson
his attorney (No Model.) 2 Sheets—Sheet 2.
J. M. HUDSON.
PLOW AND ATTACHMENT.
No. 539,131. Patented May 14, 1895.
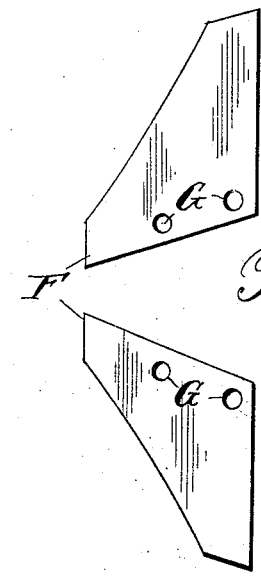
Fig. 6.
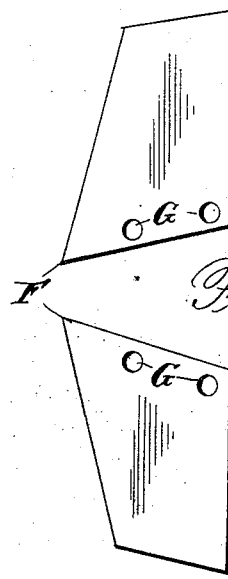
Fig. 7.
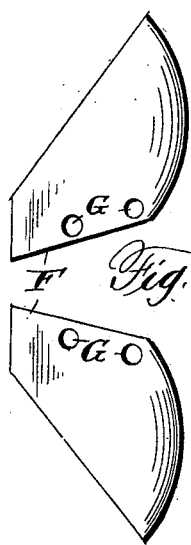
Fig. 8.
Fig. 9.
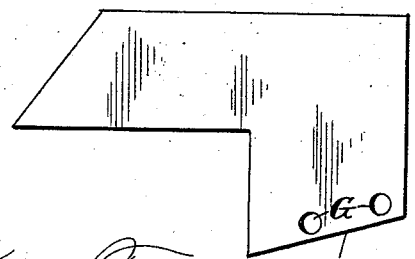
Fig. 10.
Fig. 11.
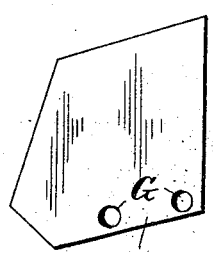
Fig. 12.
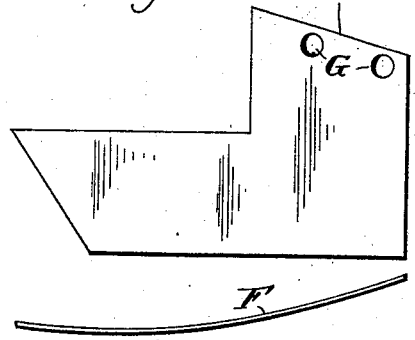
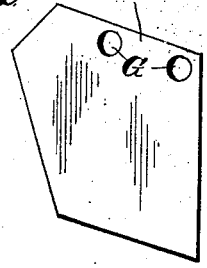
Witnesses:—
Wm E Coulter
L. L. Willson
Inventor:—
James M. Hudson
by D. H. Divilbiss
his attorney

UNITED STATES PATENT OFFICE.

JAMES MADISON HUDSON, OF ADASBURG, GEORGIA.

PLOW AND ATTACHMENT.

SPECIFICATION forming part of Letters Patent No. 539,131, dated May 14, 1895.

Application filed November 1, 1893. Serial No. 489,753. (No model.)

*To all whom it may concern:*

Be it known that I, JAMES MADISON HUDSON, a citizen of the United States, residing at Adasburg, in the county of Wilkes and State of Georgia, have invented certain new and useful Improvements in Plows and Attachments; and I do hereby declare the following to be a full, clear, and exact description of the invention, such as will enable others skilled in the art to which it appertains to make and use the same.

My invention has relation to plows, and more particularly to attachments therefor, and among the objects in view is to provide a series of blades or wings adapted to be interchangeably used with the plow for the purpose of adapting the latter for various uses, as for instance for the planting and cultivation of various crops, planting of guano or other fertilizer, &c.

Another object of my invention is to provide for the ready attachment and detachment of the various blades or wings, and also for the adjustment of the same and the plow hoe as said parts become worn, and with the above and other objects in view all of which will be readily apparent as the nature of my invention is better understood.

The invention consists in the construction, arrangement and combination of parts, all as hereinafter fully described, illustrated in the drawings, and pointed out in the appended claim.

In the drawings, Figure 1 is a perspective view of the foot of a plow-stock and a plow-hoe, showing one pair of wings or blades used for the cultivation of corn, cotton, or other growing plants in connection with the said stock and hoe. Fig. 2 is a central vertical section of the parts shown in Fig. 1. Fig. 3 is a plan view of the adjustable connecting plate or frame for the wings or blades. Fig. 4 is a rear view of said connecting-plate; Fig. 5, a vertical section of same. Figs. 6, 7, 8, 10, and 12 are plan views of the various sets of wings or blades adapted for interchangeable use with the plow. Figs. 9 and 11 are edge views of the wings shown in Figs. 8 and 10, respectively.

A indicates the foot of an ordinary plow stock to which is adjustably bolted by means of bolt B, the hoe C, which is provided with a slot D, through which passes the bolt B. The latter passes down through the forked foot of the plow stock and carries upon its lower end a nut E by which the hoe may be securely fixed in its adjusted position.

F indicates the improved wings or blades which are adapted to be interchangeably used with the plow, for which purpose each of the wings or blades is provided with perforations G, through which are adapted to pass securing screw-bolts H. The various sets of wings or blades are shaped according to the uses to which they are to be put. For instance the wings shown in Figs. 1 and 6, are adapted for the cultivation of corn, cotton or other growing crops, and consist of substantially flat pieces of metal which when in position sweep or extend laterally of the plow hoe to some distance, the forward working edge merging into the lateral edges of the hoe and forming continuations thereof as seen in Fig. 1.

I employ the following described means for adjustably connecting the various sets of wings or blades to the feet of ordinary plow stocks, said means being shown in Figs. 1 to 5, and consisting of a metallic plate, being what I denominate the narrow wings or sweeps and being substantially flat, while the wings in Fig. 12 are what I denominate the wide wings or sweeps and likewise substantially flat like the others.

The wings shown in Figs. 8 and 9, are designed for turning purposes and toward the rear end are curved upwardly.

The wings shown in Figs. 10 and 11 are designed for harrowing purposes and are slightly curved throughout their length.

In practice the wings shown in Figs. 7 and 12 are set in a position similar to that described with reference to the wings shown in Fig. 6. The turning wings or sweeps should be set upon the stock to run level or flat when cultivating crops, and for making furrows for depositing fertilizer or planting corn, the plow should be adjusted so as to run more upon the point. The harrow wings are placed upon the stock similarly to the wings in Fig. 6, and are used in planting cotton or corn and do the work heretofore done by the double-footed plows.

The relative proportions of the hoe and the various wings or sweeps may of course be varied within certain limits and properly perform their various functions, and the shapes of the wings as shown may also be varied somewhat without impairing their usefulness.

The various sets of wings or blades are adapted to be interchangeably connected with the feet of ordinary plow stocks in any suitable or desired manner and by any suitable or desired means. I however prefer to employ the connecting means shown in Figs. 1 to 5, said means consisting of a metallic plate I, which is adapted to be adjustably secured upon the under side of the foot of the plow stock by means of the bolt B, which passes through a slot K in the plate, and the latter is curved upwardly as shown at L and has the lateral portions M provided with perforations N, which are so positioned as to align with the perforations in the various wings, which latter may be interchangeably secured to the plate by means of the screw-bolts H. Thus the wings may be readily attached to the plate I and also readily detached therefrom for the purpose of substituting another set of wings for a different purpose, and it will also be seen that as the hoe becomes worn it may be adjusted forward to compensate for the wear of the same, and as the forward or working edges of the wings become worn the plate I may be readily adjusted forward.

The advantages to be derived from the use of my invention will be clearly obvious and will be appreciated by those having use for such class of devices.

What I claim is—

The combination with a plow stock, a forwardly-adjustable hoe provided with a slot and a securing bolt B passing through the said slot and stock, of a forwardly-adjustable plate I provided with a slot K and curved upwardly as at L and having the lateral portions M provided with perforations N, said bolt B passing through the slot K, and wings having perforations and screw-bolts H passing through said perforations in the wings and the perforations N.

In testimony whereof I affix my signature in presence of two witnesses.

JAMES MADISON HUDSON.

Witnesses:
  ISAAC N. ZELLAR,
  WALTON CARTLEDGE.